US011214956B2

(12) United States Patent
Chich et al.

(10) Patent No.: US 11,214,956 B2
(45) Date of Patent: Jan. 4, 2022

(54) LIQUID APPLIED ROOFING SYSTEM WITH IMPROVED MOISTURE BARRIER LAYER

(71) Applicant: BMIC LLC, Dallas, TX (US)

(72) Inventors: Adem Chich, Kearney, NJ (US); Yan Zheng, Livingston, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 16/739,609

(22) Filed: Jan. 10, 2020

(65) Prior Publication Data

US 2020/0224409 A1 Jul. 16, 2020

Related U.S. Application Data

(60) Provisional application No. 62/790,658, filed on Jan. 10, 2019.

(51) Int. Cl.
| | |
|---|---|
| *E04B 1/66* | (2006.01) |
| *E04B 1/62* | (2006.01) |
| *C09D 163/00* | (2006.01) |
| *C09D 133/10* | (2006.01) |
| *C09D 133/08* | (2006.01) |
| *C09D 183/00* | (2006.01) |

(Continued)

(52) U.S. Cl.
CPC ............... *E04B 1/66* (2013.01); *C09D 133/08* (2013.01); *C09D 133/10* (2013.01); *C09D 163/00* (2013.01); *C09D 171/00* (2013.01); *C09D 175/04* (2013.01); *C09D 183/00* (2013.01); *E04B 1/625* (2013.01); *E04B 2103/04* (2013.01)

(58) Field of Classification Search
CPC ........ E04B 1/66; E04B 1/625; E04B 2103/04; C09D 163/00; C09D 133/10; C09D 133/08; C09D 183/00; C09D 171/00; C09D 175/04; C09D 2103/04; C09D 133/26; E04D 13/1407; E04D 12/002; E04D 11/00; E04D 7/00; E04D 5/02; C08F 220/00
USPC ........................................................ 52/220.8
See application file for complete search history.

(56) References Cited

U.S. PATENT DOCUMENTS

| | | | |
|---|---|---|---|
| 3,967,032 A * | 6/1976 | Plotz .................... | D06M 15/423 428/292.1 |
| 9,303,145 B2 * | 4/2016 | Markgraf ................ | C08L 59/02 |
| 9,994,670 B2 * | 6/2018 | Rukavina ............... | C08G 18/12 |

(Continued)

*Primary Examiner* — Brent W Herring
(74) *Attorney, Agent, or Firm* — Greenberg Traurig, LLP

(57) ABSTRACT

A water barrier system to protect a roof surface from environmental conditions is disclosed. In one embodiment, the water barrier system includes an underlayment layer and a liquid applied coating. In use, the underlayment is coupled to the roof surface. Thereafter, the liquid coating is applied to the underlayment to form a barrier layer. The underlayment may be manufactured from a porous material so that the liquid applied coating is at least partially absorbed by the porous underlayment. In this manner, direct application of the liquid coating to the roof surface is eliminated. In one embodiment, the underlayment may be provided with a load bearing component/layer and a coating absorbing component/layer. For flat roof applications, the load bearing component/layer may be provided with increased rigidity for dimensional and installation stability. Meanwhile, for roof penetration applications, the load bearing component/layer may be provided with increased elasticity to enable the underlayment to wrap about the penetration.

15 Claims, 3 Drawing Sheets

(51) Int. Cl.
    *C09D 171/00*     (2006.01)
    *C09D 175/04*     (2006.01)

(56) References Cited

U.S. PATENT DOCUMENTS

| | | | |
|---|---|---|---|
| 10,704,254 B2 * | 7/2020 | Seabaugh | B32B 27/065 |
| 2003/0124932 A1 * | 7/2003 | Droux | D21H 13/40 |
| | | | 442/164 |
| 2004/0127120 A1 * | 7/2004 | Zanchetta | B32B 27/12 |
| | | | 442/45 |
| 2007/0137130 A1 * | 6/2007 | Zickell | B32B 7/06 |
| | | | 52/506.01 |
| 2010/0178827 A1 * | 7/2010 | Thai | B32B 27/32 |
| | | | 442/245 |
| 2012/0077010 A1 * | 3/2012 | Manesis | B32B 5/26 |
| | | | 428/220 |
| 2012/0160414 A1 * | 6/2012 | Pampanas | C09D 133/06 |
| | | | 156/331.7 |
| 2013/0102718 A1 * | 4/2013 | Markgraf | C08L 71/00 |
| | | | 524/354 |
| 2013/0331488 A1 * | 12/2013 | Markgraf | C08K 7/14 |
| | | | 524/100 |
| 2015/0125684 A1 * | 5/2015 | Ando | C08G 65/336 |
| | | | 428/220 |
| 2015/0315413 A1 * | 11/2015 | Diggins | C09J 163/00 |
| | | | 427/387 |
| 2016/0257809 A1 * | 9/2016 | Biondini | C08L 23/20 |
| 2017/0173916 A1 * | 6/2017 | Widenbrant | B32B 7/12 |
| 2017/0275494 A1 * | 9/2017 | Jahns | C08G 18/0828 |
| 2017/0291384 A1 * | 10/2017 | Hyer | B32B 5/022 |
| 2018/0237662 A1 * | 8/2018 | Widenbrant | B32B 27/08 |
| 2019/0382622 A1 * | 12/2019 | Seabaugh | B32B 5/024 |

* cited by examiner

LIQUID APPLIED ROOFING SYSTEM WITH IMPROVED MOISTURE BARRIER LAYER

CROSS-REFERENCE TO RELATED APPLICATIONS

This is a non-provisional of, and claims the benefit of the filing date of, U.S. provisional patent application No. 62/790,658, filed Jan. 10, 2019, entitled "Liquid Applied Roofing System with Improved Moisture Barrier Layer," which application is incorporated in its entirety by reference herein.

FIELD OF THE DISCLOSURE

The present disclosure relates generally to roofing systems, and more particularly to improved water barrier layers and systems.

BACKGROUND OF THE DISCLOSURE

It is generally known in the art to apply a liquid coating such as, for example, a silicone coating or the like, to a roof surface for water protection. However, certain liquid applied coatings can suffer from a number of disadvantages. For example, preparation work generally associated with liquid applied coatings can be labor-intensive requiring, for example, complete cleaning of the roof (e.g., power washing, application of a cleaning solvent, etc.). If the roof surface is improperly cleaned prior to application of the liquid applied coating, the liquid coating could delaminate from the roof surface due to improper adhesion. Additionally, the roof surface must be completely dry before application of the liquid applied coating.

Even if the roof surface is properly prepared, certain liquid applied coatings can suffer from poor adhesion to common roof substrates, thus requiring utilization of an additional liquid applied primer such as, for example, an epoxy primer, between the liquid applied coating and roof surface. Alternatively, some liquid applied coatings may incorporate an adhesion promotor for facilitating improved adhesion to the roof surface. However, these adhesion promotors are often very expensive. Additionally, liquid applied coatings often suffer from poor tear resistance and other poor mechanical properties.

Additionally, roof penetrations (e.g., extruding pipes, vents, power lines, etc. extending through the roof surface) can present problematic issues for existing roofing systems. For example, improperly sealing against a penetration may lead to water seeping through the weatherproof roofing surface (e.g., snow or water penetrates the roofing surface through the formed opening for the roof penetration causing water to seep into the structures beneath the roof surface). As a result, flashing, metal sheeting, elastomeric boots, or the like (collectively flashing herein without the intent to limit) is usually installed around the roof penetration to prevent water leakage.

Utilization of flashing to weatherproof roof penetrations is well known. Conventional flashing for pipe and other roof penetrations are typically made from thin sheet metal that is cut and formed into a desired shape by construction workers at the building site. Alternatively, pre-fabricated flashing systems formed into specific configurations may be purchased and installed. The flashing is usually formed from a piece of sheet material that has a central opening cut therein to receive the roof penetration. Thereafter, a sealing material, such as, for example, caulk or the like, is placed about the juncture of the roof penetration and the central opening formed in the flashing. However, installation of flashing about the roof penetration is often difficult, labor-intensive, and time-consuming. In addition, flashing is often made from essentially planar sheets that can be difficult to conform to irregular shapes presented, which often leads to increased likelihood of leakage at the central opening, or at the junction between the flashing and the roof surface.

It would be desirable to provide an improved roofing system for coupling a liquid applied coating to a roof surface. Additionally, it would be beneficial to provide a roofing system that eliminates, or at least minimizes, the utilization of flashing in and around roof penetrations.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one embodiment, disclosed herein is a water barrier layer or system for use in a roofing system to protect a roof surface from environmental conditions such as, for example, moisture, rain, snow, etc. In one embodiment, the water barrier layer or system includes a porous layer coupled to a roof surface, and a liquid applied coating. In use, the porous layer may be mechanically fastened to the roof surface. Alternatively, the porous layer may include an adhesive such as, for example, an adhesive back surface, for coupling to the roof surface. Thereafter, the liquid coating is applied to the porous layer to form a water barrier layer characterized by a percent elongation to failure of 2-50%, a tensile strength in the machine direction of 450-11,000 psi, and a tensile strength in the cross machine direction of 800-12,500 psi. In this manner, direct application of the liquid coating to the roof surface is eliminated.

In one example embodiment, the porous layer may include a mechanical load bearing component or layer and a coating absorbing component or layer. When used or coupled to a flat roof (i.e., roof applications), the mechanical load bearing component may be arranged and configured for dimensional stability and installation durability. In addition, the mechanical load bearing component or layer is arranged and configured with sufficient mechanical strength to be coupled to the roof via, for example, fasteners. That is, in connection with roof applications, the mechanical load bearing component or layer of the porous layer is arranged and configured to provide a certain rigidity to maintain dimensional stability and installation reliability, and to protect the coating layer from excessive distortion or dislocation. Alternatively, when used or coupled to roof penetrations (i.e., penetration applications), the mechanical load bearing component may be arranged and configured to provide increased elasticity to enable the porous layer to fit different penetrations' sizes and shapes. In either event, the coating absorbing component or layer may be arranged and configured for effective coating penetration, coating thickness control, coating adhesion, coating sagging control on a non-horizontal surface, etc.

The porous layer may be manufactured from a porous material so that the liquid applied coating is at least partially absorbed therein.

In accordance with another aspect of the present disclosure, a method and system for applying a liquid coating to a roof surface is provided. In one example embodiment, the method includes coupling a porous layer to the roof surface, and applying a liquid coating to the porous layer to form a barrier layer characterized by a percent elongation to failure of 2-50%, a tensile strength in the machine direction of 450-11,000 psi, and a tensile strength in the cross machine direction of 800-12,500 psi. In embodiments, the liquid coating at least partially absorbs into the porous layer. In embodiments, the roof surface is not cleaned prior to coupling the porous layer to the roof surface.

In accordance with another aspect of the present disclosure, a method and system for sealing an opening surrounding a roof penetration is provided. In one example embodiment, the method includes coupling a porous layer to the roof penetration, and applying a liquid coating to the porous layer to form a barrier layer characterized by a percent elongation to failure of 2-50%, a tensile strength in the machine direction of 450-11,000 psi, and a tensile strength in the cross machine direction of 800-12,500 psi. In embodiments, the liquid coating at least partially absorbs into the porous layer.

In one example embodiment, coupling the porous layer to the roof penetration includes at least partially wrapping the porous layer about the roof penetration. The porous layer being arranged and configured to be sufficiently elastic so that it can be tightly wrapped around the roof penetration.

In one example embodiment, coupling the porous layer to the roof penetration includes selecting an appropriately sized and shaped prefabricated porous layer, and positioning the prefabricated porous layer about the roof penetration.

In one example embodiment, the porous layer may include an adhesive surface for coupling to the roof penetration. Alternatively, in on example embodiment, the porous layer is arranged and configured so that heating the porous layer causes the porous layer to tighten or heat shrink about the roof penetration.

BRIEF DESCRIPTION OF THE DRAWINGS

By way of example, a specific embodiment of the disclosed device will now be described, with reference to the accompanying drawings, in which.

Figure 1:
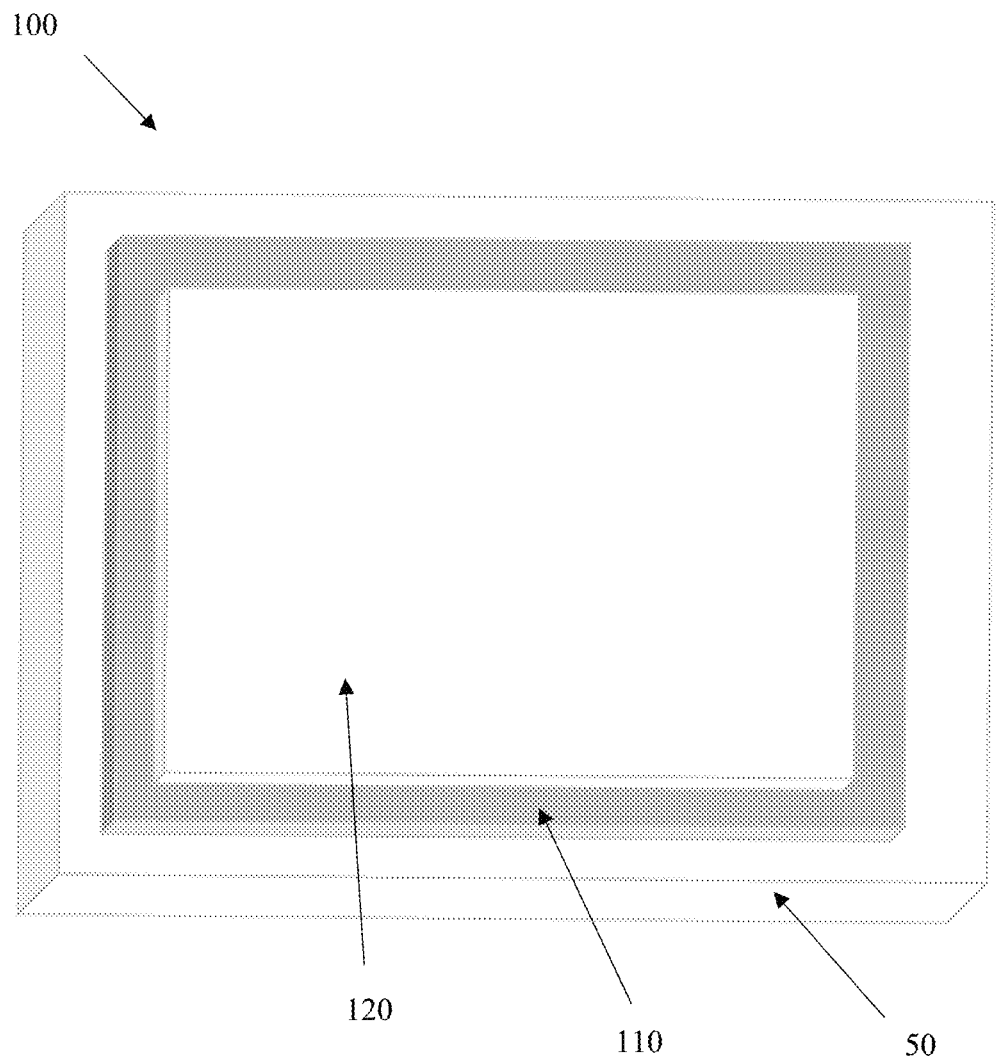
FIG. 1 is an exploded, perspective view of an embodiment of a water barrier layer or system in accordance with one or more aspects of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

DETAILED DESCRIPTION

Numerous embodiments of an improved water barrier layer or system (used interchangeably herein without the intent to limit) in accordance with the present disclosure will now be described more fully hereinafter with reference to the accompanying drawings, in which embodiments of the present disclosure are presented. The water barrier system of the present disclosure may, however, be embodied in many different forms and should not be construed as being limited to the embodiments set forth herein. Rather, these embodiments are provided so that this disclosure will convey certain example aspects of the water barrier system to those skilled in the art. In the drawings, like numbers refer to like elements throughout unless otherwise noted.

As will be described in greater detail below, in accordance with one aspect of the present disclosure, an improved water barrier system is disclosed. In one embodiment, the water barrier system includes an underlayment layer and a liquid applied coating. In use, in one embodiment, the underlayment is coupled to a roof surface. Thereafter, the liquid coating is applied to the underlayment.

Figure 2:
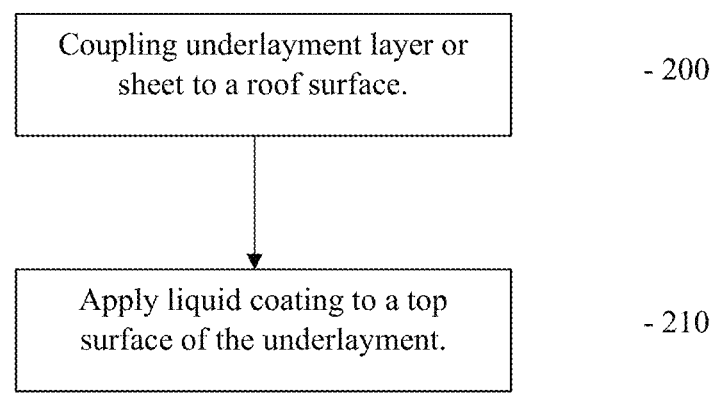
FIG. 2 is a schematic illustrating an embodiment of a disclosed method in accordance with one or more aspects of the present disclosure.

Referring to FIG. 1, in one illustrated embodiment, an improved water barrier system 100 is disclosed. As illustrated, the water barrier system 100 includes porous layer (in an embodiment, sometimes referred to herein as an underlayment) 110 and a liquid applied coating 120. Referring to FIG. 2, in one illustrated embodiment, the water barrier system 100 can be installed by, at 200, coupling the underlayment 110 to the roof surface 50. Next, at 210, the liquid applied coating 120 can be applied to the underlayment 110 thereby eliminating the requirement that the liquid coating 120 be applied directly to the roof surface 50.

In use, the underlayment 110 is positioned on the roof surface, deck, substrate, etc. 50 (used interchangeably herein without the intent to limit). For example, in one embodiment, the underlayment 110 may be a prefabricated sheet of material. The underlayment may be manufactured from woven or non-woven fabrics, scrim, sheet, fleece-like materials, meshes, open cell foams, or any other porous material arranged and configured to at least partially absorb, for example, the liquid applied coating 120. In one embodiment, the underlayment 110 is manufactured from a thin layer of loosely packed material.

In embodiments, the underlayment 110 has a thickness of 3-100 mils, 3-90 mils, 3-80 mils, 3-70 mils, 3-60 mils, 3-50 mils, 3-40 mils, 3-30 mils, 3-20 mils, 3-10 mils, 5-100 mils, 5-90 mils, 5-80 mils, 5-70 mils, 5-60 mils, 5-50 mils, 5-40 mils, 5-30 mils, 5-20 mils, 5-10 mils, 15-100 mils, 15-90 mils, 15-80 mils, 15-70 mils, 15-60 mils, 15-50 mils, 15-40 mils, 15-30 mils, 25-100 mils, 25-90 mils, 25-80 mils, 25-70 mils, 25-60 mils, 25-50 mils, 25-40 mils, 35-100 mils, 35-90 mils, 35-80 mils, 35-70 mils, 35-60 mils, 35-50 mils, 45-100 mils, 45-90 mils, 45-80 mils, 45-70 mils, 45-60 mils, 55-100 mils, 55-90 mils, 55-80 mils, 55-70 mils, 65-100 mils, 65-90 mils, 65-80 mils, 75-100 mils, 75-90 mils, and 86-100 mils.

In one example embodiment, the underlayment 110 includes a mechanical load bearing component or layer and a coating absorbing component or layer. In use, the mechanical load bearing component or layer and the coating absorbing component or layer can be coupled together by any suitable means now known or hereafter developed including, for example, the components or layers can be laminated together, embedded, interweaved, integrated into a single entity, etc. In use, when used for application on a flat roof type surface, for example, as schematically illustrated in FIG. 1, the load bearing component or layer is arranged and configured for dimensional stability and installation durability, while the coating absorbing component is arranged and configured for effective coating penetration, coating thickness control, coating adhesion, coating sagging control on a non-horizontal surface, etc. In addition, the mechanical load bearing component or layer is arranged and configured with sufficient mechanical strength to be coupled to the roof via, for example, fasteners. That is, in connection with flat roof applications as schematically illustrated in FIG. 1, the mechanical load bearing component or layer of the underlayment 110 is arranged and configured to provide a certain rigidity to maintain dimensional stability and installation reliability, and to protect the coating layer from excessive distortion or dislocation. Examples of underlayment materials include fiberglass, polyester, thermoplastic olefin, and polypropylene. Examples of commercially available underlayment include FeltBuster® (GAF, Parsippany, N.J.), StormSafe™ (GAF, Parsippany, N.J.), Tiger-Paw™ (GAF, Parsippany, N.J.), Evalith® (Johns Manville, Denver, Colo.), Base Fabric Style T359 from Tietex International, Ltd.; GD8811/V38/V38/99, XP403, XP414, W4023, W4503 and W4520 from Saint-Gobain Adfors America; and S615 from HDK Industries, Inc.

In use, the underlayment 110 may be coupled to the underlying roof surface 50 by any suitable mechanism now known or hereafter developed including, for example, mechanical fasteners (nails, staples, screws, etc.), an adhesive, etc. For example, in one embodiment, the underlayment 110 may include an adhesive back surface for coupling to the roof surface 50.

Thereafter, as illustrated in FIGS. 1 and 2, the liquid applied coating 120 is applied onto the underlayment 110. In this manner, the underlayment 110 may act as a template for installation of the liquid applied coating 120. The liquid coating 120 can be any liquid coating now known or hereafter developed including, for example, a silicone coating, an acrylic coating, a polyurethane coating, an epoxy, a poly(methyl methacrylate) (PMMA), a silane terminated polyether (STP), or the like. For example, in embodiments, commercially available coatings include Unisil HS silicone roof coating and HydroStop®, each provided by GAF® Materials Corporation. In use, the liquid coating 120 can be applied to a top surface of the underlayment 110 by any suitable mechanism now known or hereafter developed including, for example, spraying, rolling, brushing, etc. In one example embodiment, because the underlayment 110 acts as the load bearing part or component of the system, the coating 120 can be arranged and configured to sacrifice, minimize, or the like the mechanical strength and adhesion characteristics of the coating 120 in pursuit of better durability, aesthetic effects, cost reduction, etc.

In embodiments, the liquid applied coating 120 has a thickness of 5-200 mils, 5-180 mils, 5-160 mils, 5-140 mils, 5-120 mils, 5-100 mils, 5-80 mils, 5-60 mils, 5-40 mils, 5-20 mils, 5-10 mils, 20-200 mils, 20-180 mils, 20-160 mils, 20-140 mils, 20-120 mils, 20-100 mils, 20-80 mils, 20-60 mils, 20-40 mils, 40-200 mils, 40-180 mils, 40-160 mils, 40-140 mils, 40-120 mils, 40-100 mils, 40-80 mils, 40-60 mils, 60-200 mils, 60-180 mils, 60-160 mils, 60-140 mils, 60-120 mils, 60-100 mils, 60-80 mils, 80-200 mils, 80-180 mils, 80-160 mils, 80-140 mils, 80-120 mils, 80-100 mils, 100-200 mils, 100-180 mils, 100-160 mils, 100-140 mils, 100-120 mils, 120-200 mils, 120-180 mils, 120-160 mils, 120-140 mils, 140-200 mils, 140-180 mils, 140-160 mils, 160-200 mils, 160-180 mils and 180-200 mils.

In use, by coupling a sheet of underlayment 110 via, for example, mechanical fasteners, in-between the roof surface 50 and the liquid applied coating 120, a number of advantages can be achieved. For example, elimination of labor intensive roof preparation (e.g., cleaning and drying of the roof surface 50 is minimized since the underlayment 110 is mechanically fastened to the roof surface 50), designing and manufacturing the liquid applied coating 120 without incorporating expensive adhesion promoters (e.g., liquid applied coating 120 can be formulated with a simple adhesion promoter to ensure proper adhesion to the underlayment only), elimination of primers to the roof surface 50 prior to placement of the liquid applied coating 120 (e.g., need for application of the primer is eliminated since the underlayment 100 is being mechanically coupled to the roof surface 50 and the liquid coating 120 is applied directly to the underlayment 110), etc.

Additionally, in use, the underlayment 110 can serve as a reinforcement layer for the liquid coating 120 therefore alleviating concerns with respect to, for example, tear resistance of the liquid coating 120. In this manner, the liquid coating 120 can be formulated without any expensive formulation strategies, ingredients, etc. to improve the mechanical strength including, for example, the elongation and tear resistance of the liquid coating 120.

In embodiments, the water barrier system comprising an underlayment and liquid applied coating as described herein is characterized by a percent elongation to failure of 2-50%, 2-45%, 2-40%, 2-35%, 2-30%, 2-25%, 2-20%, 2-15%, 2-10%, 2-5%, 7-50%, 7-45%, 7-40%, 7-35%, 7-30%, 7-25%, 7-20%, 7-15%, 12-50%, 12-56%, 12-40%, 12-35%, 12-30%, 12-25%, 12-20%, 17-50%, 17-45%, 17-40%, 17-35%, 17-30%, 17-25%, 22-50%, 22-45%, 22-40%, 22-35%, 22-30%, 27-50%, 27-45%, 27-40%, 27-35%, 32-50%, 32-45%, 32-40%, 37-50%, 37-45%, and 42-50%.

In embodiments, the water barrier system comprising an underlayment and liquid applied coating as described herein is characterized by a tensile strength in the machine direction (MD) of 450-11,000 psi, 450-10,000 psi, 450-9,000 psi, 450-8,000 psi, 450-7,000 psi, 450-6,000 psi, 450-5,000 psi, 450-4,000 psi, 450-3,000 psi, 450-2,000 psi, 450-1,000 psi, 1,450-11,000 psi, 1,450-10,000 psi, 1,450-9,000 psi, 1,450-8,000 psi, 1,450-7,000 psi, 1,450-6,000 psi, 1,450-5,000 psi, 1,450-4,000 psi, 1,450-3,000 psi, 1,450-2,000 psi, 2,450-11,000 psi, 2,450-10,000 psi, 2,450-9,000 psi, 2,450-8,000 psi, 2,450-7,000 psi, 2,450-6,000 psi, 2,450-5,000 psi, 2,450-4,000 psi, 2,450-3,000 psi, 3,450-11,000 psi, 3,450-10,000 psi, 3,450-9,000 psi, 3,450-8,000 psi, 3,450-7,000 psi, 3,450-6,000 psi, 3,450-5,000 psi, 3,450-4,000 psi, 4,450-11,000 psi, 4,450-10,000 psi, 4,450-9,000 psi, 4,450-8,000 psi, 4,450-7,000 psi, 4,450-6,000 psi, 4,450-5,000 psi, 5,450-11,000 psi, 5,450-10,000 psi, 5,450-9,000 psi, 5,450-8,000 psi, 5,450-7,000 psi, 5,450-6,000 psi, 6,450-11,000 psi, 6,450-10,000 psi, 6,450-9,000 psi, 6,450-8,000 psi, 6,450-7,000 psi, 7,450-11,000 psi, 7,450-10,000 psi, 7,450-9,000 psi, 7,450-8,000 psi, 8,450-11,000 psi, 8,450-10,000 psi, 8,450-9,000 psi, 9,450-11,000 psi, 9,450-10,000 psi, and 10,450-1,000 psi.

In embodiments, the water barrier system comprising an underlayment and liquid applied coating as described herein is characterized by a tensile strength in the cross machine direction (CD) of 800-12,500 psi, 800-11,500 psi, 800-10,500 psi, 800-9,500 psi, 800-8,500 psi, 800-7,500 psi, 800-6,500 psi, 800-5,500 psi, 800-4,500 psi, 800-3,500 psi, 800-2,500 psi, 800-1,500 psi, 1,800-12,500 psi, 1,800-11,500 psi, 1,800-10,500 psi, 1,800-9,500 psi, 1,800-8,500 psi, 1,800-7,500 psi, 1,800-6,500 psi, 1,800-5,500 psi, 1,800-4,500 psi, 1,800-3,500 psi, 1,800-2,500 psi, 2,800-12,500 psi, 2,800-11,500 psi, 2,800-10,500 psi, 2,800-9,500 psi, 2,800-8,500 psi, 2,800-7,500 psi, 2,800-6,500 psi, 2,800-5,500 psi, 2,800-4,500 psi, 2,800-3,500 psi, 3,800-12,500 psi, 3,800-11,500 psi, 3,800-10,500 psi, 3,800-9,500 psi, 3,800-8,500 psi, 3,800-7,500 psi, 3,800-6,500 psi, 3,800-5,500 psi, 3,800-4,500 psi, 4,800-12,500 psi, 4,800-11,500 psi, 4,800-10,500 psi, 4,800-9,500 psi, 4,800-8,500 psi, 4,800-7,500 psi, 4,800-6,500 psi, 4,800-5,500 psi, 5,800-12,500 psi, 5,800-11,500 psi, 5,800-10,500 psi, 5,800-9,500 psi, 5,800-8,500 psi, 5,800-7,500 psi, 5,800-6,500 psi, 6,800-12,500 psi, 6,800-11,500 psi, 6,800-10,500 psi, 6,800-9,500 psi, 6,800-8,500 psi, 6,800-7,500 psi, 7,800-12,500 psi, 7,800-11,500 psi, 7,800-10,500 psi, 7,800-9,500 psi, 7,800-8,500 psi, 8,800-12,500 psi, 8,800-11,500 psi, 8,800-10,500 psi, 8,800-9,500 psi, 9,800-12,500 psi, 9,800-11,500 psi, 9,800-10,500 psi, 10,800-12,500 psi, 10,800-11,500 psi, and 11,800-12,500 psi.

The water barrier system results in pull resistance suitable for use in roofing applications. For example, an embodiment comprising a Feltbuster underlayment and Unisil HS liquid applied coating was found to have a maximum load to failure of 50-125 lbf in tear and rupture testing. As another example, an embodiment comprising a synthetic woven underlayment and Unisil HS liquid applied coating was found to have a maximum load to failure of 30-400 lbf in tear and rupture testing.

In accordance with another aspect of the present disclosure, the improved water barrier system 100 facilitates easier application for use in weatherproofing a roof penetration. That is, when used in connection with roof penetrations, the underlayment 210 may be arranged and configured to provide increased elasticity (e.g., increased elasticity or flexibility as compared to the underlayment 110 described above in connection with roof applications), the increased flexibility provided by the underlayment 210 enables easier installation in increased water penetration areas (e.g., roofing areas surrounding, for example, openings, extruding pipes, extruding vents, etc.). In use, the underlayment 210 may be provided with increased flexibility so that any penetrating pipes, etc. can be wrapped by the underlayment 210 and subsequently covered by the liquid coating 120 without any extra requirements, thus decreasing installation time and increasing associated savings.

Figure 3:
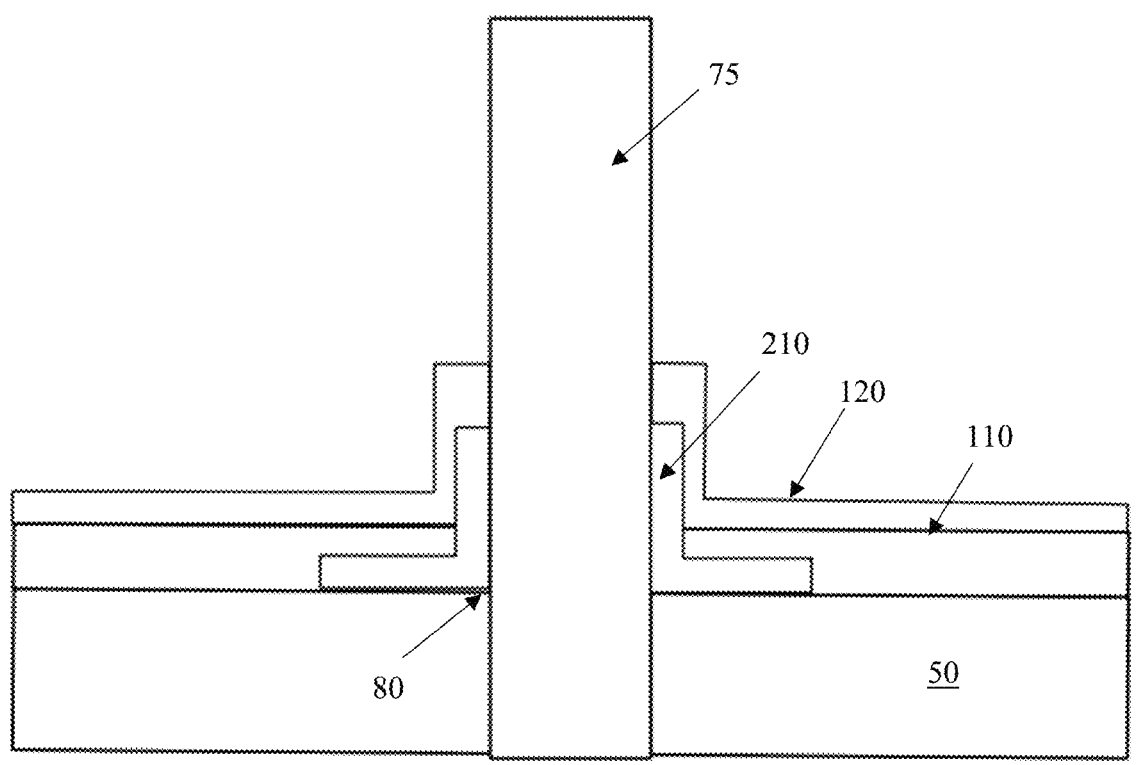
FIG. 3 is a cross-sectional view of an embodiment of a water barrier layer or system for use in sealing roof penetrations in accordance with one or more aspects of the present disclosure.

Referring to FIG. 3, in accordance with one aspect of the present disclosure, the underlayment 210 may be coupled to (e.g., wrapped about) a roof penetration 75 such as, for example, extruding pipes, vents, etc. extending through the roof surface 50. Additionally, an underlayment such as, for example, underlayment 110 described above or underlayment 210, may extend along a length or area of the roof surface 50. In this manner, the opening 80 formed in the roof surface 50 where the roof penetration 75 extends is covered and sealed from water penetration. Thereafter, a liquid applied coating 120 may be applied to the underlayment 210. In use, the underlayment 210 is arranged and configured to absorb the liquid applied coating 120. As such, an easy to install weather proof system is provided for sealing roof penetrations.

In use, the underlayment 210 can be positioned onto and around the roof penetration 75. The underlayment 210 can be coupled to the roof penetration 75 by any suitable mechanism now known or hereafter developed such as, for example, via elasticity of the material (e.g., underlayment 210 can be sufficiently elastic so that it can be tightly wrapped around the roof penetration 75), heat induced shrinkage (e.g., heating of the underlayment 210 after the underlayment 210 has been properly positioned can cause the underlayment 210 to shrink and thus tighten about the roof penetration 75), an adhesive backing, application of an adhesive, fasteners, etc. Thereafter, the underlayment 210 can serve as a template for subsequent application of the liquid applied coating 120, which, in use, will at least partially penetrate, soak, absorb, etc. into the underlayment 210. In this manner, sufficient thickness of the underlayment 210 in combination with the liquid coating 120 on a vertical, extruding surfaces of the roof penetration 75 will be generated to ensure that the liquid coating 120 remains in proper position, thus forming a proper seal around the opening 80 formed between the roof penetration 75 and the roof surface 50.

In one example embodiment, the underlayment 210 may be provided as a prefabricated sheet of elastic or fleece-like material. In use, the prefabricated sheet can be installed onto the roof penetration 75. Thereafter, the prefabricated sheet can serve as a template and reinforcement, as previously described, for subsequent application of liquid applied coatings 120 to form a proper seal around the roof penetration 75. In one example embodiment, the underlayment 210 is arranged and configured so that it can fit on and be secured to (e.g., wrapped about) the roof penetration.

In one example embodiment, the underlayment 210 may be manufactured from a thin layer of loosely packed, porous materials that can be readily installed or coupled to a roof penetration 75 in the roof surface. The loosely packed, porous material can be a fabric (woven or non-woven), a wire mesh, open cell foams, or any other material arranged and configured to have a porous structure for absorbing, for example, the liquid applied coating 120.

In use, similar to the underlayment 110 described above for use in flat roof applications, the underlayment 210 for roof penetration applications can include a mechanical load bearing component or layer and a coating absorbing component or layer. However, for penetration applications, the mechanical lead bearing component or layer is arranged and configured to provide increased elasticity to enable the underlayment 210 to fit different penetrations' sizes and shapes. That is, for roof penetration applications, the underlayment 210 of the present disclosure is more elastic and thus easier to install around roof penetrations thus saving time and money. That is, given the elastic nature of the underlayment 210, the underlayment 210 is arranged and configured to easily conform to the shape of the roof penetration 75.

In use, the underlayment 210 can be provided in any number of sizes and shapes. Additionally, the underlayment 210 can be provided in a free form sheet of material for application onto and/or around the roof penetration 75. In one embodiment, the underlayment 210 can be installed around the roof penetration 75. Thereafter, the liquid coating 120 can be applied to the underlayment 210 via, for example a brush, spray coating, etc., so that the coating 120 is saturated into and/or onto the underlayment 210. For example, for flat roof applications, the underlayment 110 can be provided as a sheet, in roll formed, or the like. Alternatively, for roof penetration applications, the underlayment 210 can be provided in a pipe fleece design, etc.

While the present disclosure refers to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority but are used to distinguish one feature from another. The drawings are for purposes of illustration only and the dimensions, positions, order and relative to sizes reflected in the drawings attached hereto may vary.

What is claimed is:
1. A roofing system comprising:
a roof deck;
a roof penetration extending outwardly from an upper surface of the roof deck,
  wherein the roof penetration is selected from the group consisting of a pipe,
  a vent, a power line, and any combination thereof,
  wherein the roof penetration does not comprise a metal flashing; and
a water barrier system comprising
  an underlayment comprising:
    i. a first portion overlaying the upper surface of the roof deck, and
    ii. a second portion surrounding the roof penetration;
  a porous layer contacting the first portion of the underlayment and the upper surface of the roof deck,
    wherein the porous layer is selected from the group consisting of fiberglass, thermoplastic olefin, polypropylene, and any combination thereof, and
    wherein the porous layer does not contact the roof penetration; and
  a coating layer contacting the porous layer and the second portion of the underlayment;
    wherein the water barrier system is characterized by an elongation to failure of 2-50%.

2. The roofing system of claim 1, wherein the coating layer is at least partially absorbed by the porous layer.

3. The roofing system of claim 1, wherein the underlayment includes an adhesive surface configured for coupling to the roof penetration.

4. The roofing system of claim 1, wherein the porous layer is characterized by a thickness of 3-100 mils.

5. The roofing system of claim 1, wherein the coating layer is characterized by a thickness of 5-200 mils.

6. The roofing system of claim 5, wherein the coating layer is characterized by a thickness of 20-40 mils.

7. The roofing system of claim 1, wherein the coating layer comprises a material selected from the group consisting of silicone, acrylic, polyurethane, epoxy, polymethyl methacrylate and a silane terminated polyether.

8. A method comprising:
obtaining an underlayment;
overlaying a first portion of the underlayment on an upper surface of a roof deck;
applying a second portion of the underlayment around a roof penetration,
  wherein the roof penetration is selected from the group consisting of a pipe, a vent,
  a power line, and any combination thereof, and
  wherein the roof penetration does not comprise a metal flashing;
obtaining a porous layer;
  wherein the porous layer is selected from the group consisting of fiberglass, thermoplastic olefin, polypropylene, and any combination thereof; and
applying the porous layer to the first portion of the underlayment and to the upper surface of the roof deck,
  wherein the porous layer does not contact the roof penetration;
applying a liquid coating to the porous layer and to the second portion of the underlayment to form a solidified water barrier layer, wherein the solidified water barrier layer is characterized by an elongation to failure of 2-50%.

9. The method of claim 8, wherein the liquid coating is at least partially absorbed into the porous layer.

10. The method of claim 8, wherein applying underlayment around the roof penetration includes mechanically fastening the porous layer to the roof penetration.

11. The method of claim 8, wherein the roof penetration is not cleaned prior to the step of applying the underlayment around the roof penetration.

12. The method of claim 8, wherein applying the the second portion of the underlayment around the roof penetration includes:
selecting an appropriately sized and shaped prefabricated underlayment; and
positioning the second portion of the prefabricated underlayment around the roof penetration.

13. The method of claim 8, wherein the second portion of the underlayment includes an adhesive surface configured for coupling to the roof penetration.

14. The method of claim 8, further comprising heating the underlayment sufficiently so that the underlayment tightens about the roof penetration.

15. The method of claim 8, wherein the porous layer is manufactured from a fabric material of loosely packed, porous material.

\* \* \* \* \*